US008140497B2

(12) United States Patent
Goodman et al.

(10) Patent No.: US 8,140,497 B2
(45) Date of Patent: Mar. 20, 2012

(54) SYSTEM AND METHOD FOR IMPLEMENTING NONBLOCKING ZERO-INDIRECTION TRANSACTIONAL MEMORY

(75) Inventors: James R. Goodman, Auckland (NZ); Mark S. Moir, Windham, NH (US); Fu'ad W. F. Al Tabba', Auckland (NZ); Cong Wang, Auckland (NZ)

(73) Assignee: Oracle America, Inc., Redwood City, CA (US)

( * ) Notice: Subject to any disclaimer, the term of this patent is extended or adjusted under 35 U.S.C. 154(b) by 395 days.

(21) Appl. No.: 11/967,381

(22) Filed: Dec. 31, 2007

(65) Prior Publication Data
US 2009/0171962 A1   Jul. 2, 2009

(51) Int. Cl.
*G06F 17/00*   (2006.01)
(52) U.S. Cl. ......... 707/704; 707/609; 707/687; 707/703
(58) Field of Classification Search .................. 707/703, 707/704, 609, 687
See application file for complete search history.

(56) References Cited

U.S. PATENT DOCUMENTS

| | | | |
|---|---|---|---|
| 5,638,519 A * | 6/1997 | Haluska ........................... 705/28 |
| 6,009,426 A * | 12/1999 | Jouenne et al. .................... 707/8 |
| 6,035,379 A * | 3/2000 | Raju et al. ...................... 711/162 |
| 6,078,999 A * | 6/2000 | Raju et al. ...................... 711/161 |
| 6,178,519 B1 * | 1/2001 | Tucker ........................... 714/4.4 |
| 6,256,637 B1 * | 7/2001 | Venkatesh et al. ..................... 1/1 |
| 6,845,384 B2 * | 1/2005 | Bamford et al. ....................... 1/1 |
| 7,383,285 B1 * | 6/2008 | Pal et al. ............................. 1/1 |
| 2006/0085591 A1 * | 4/2006 | Kumar et al. .................. 711/113 |
| 2006/0173885 A1 | 8/2006 | Moir et al. |
| 2007/0136289 A1 * | 6/2007 | Adl-Tabatabai et al. ......... 707/8 |
| 2007/0156780 A1 * | 7/2007 | Saha et al. ..................... 707/202 |
| 2007/0169031 A1 | 7/2007 | Harris |
| 2008/0256073 A1 * | 10/2008 | Detlefs et al. ...................... 707/8 |
| 2008/0313645 A1 * | 12/2008 | Birrell et al. ................... 719/312 |

OTHER PUBLICATIONS

Virendra J. Marathe, Michael F. Spear, Christopher Heriot, Athul Acharya, David Eisenstat, William N. Scherer III, and Michael L. Scott, "Lowering the overhead of nonblocking software transactional memory," Technical Report TR893, University of Rochester, Computer Science Department, Mar. 2006.
Eisenstat, David, "Two Interfaces to the RSTM Transactional Memory System," Department of Computer Science, University of Rochester, May 9, 2006.

* cited by examiner

*Primary Examiner* — Shahid Alam
*Assistant Examiner* — Andalib Lodhi
(74) *Attorney, Agent, or Firm* — Robert C. Kowert; Meyertons, Hood, Kivlin, Kowert & Goetzel, P.C.

(57) ABSTRACT

Systems and methods for implementing and using nonblocking zero-indirection software transactional memory (NZSTM) are disclosed. NZSTM systems implement object-based software transactional memory that eliminates all levels of indirection except in the uncommon case of a conflict with an unresponsive thread. Shared data is co-located with a header in an NZObject, and is addressable at a fixed offset from the header. Conflicting transactions are requested to abort themselves without being forced to abort. NZObjects are modified in place when there are no conflicts, and when a conflicting transaction acknowledges the abort request. In the uncommon case, NZObjects are inflated to introduce a locator and some levels of indirection, and are restored to their un-inflated form following resolution of the conflict. In some embodiments, transactions are executed using best effort hardware transactional memory if it is available and effective, and software transactional memory if not, yielding a hybrid transactional memory system, NZTM.

19 Claims, 9 Drawing Sheets

SYSTEM AND METHOD FOR IMPLEMENTING NONBLOCKING ZERO-INDIRECTION TRANSACTIONAL MEMORY

BACKGROUND OF THE INVENTION

1. Field of the Invention

This invention relates generally to coordination amongst concurrent execution sequences in a multiprocessor, and more particularly, to a system and method for coordinating access to shared objects in a transactional memory space using nonblocking zero-indirection data objects.

2. Description of the Related Art

With the computer industry increasingly focusing on building multi-core processor chips, rather than making individual processors faster, it is increasingly important for everyday applications to be able to exploit multiple cores concurrently. In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads. However, concurrent programming using traditional mechanisms such as locks and condition variables is subject to a number of serious pitfalls, including troublesome tradeoffs between performance, scalability, and software complexity.

Transactional memory is a paradigm that allows a programmer to design code as if multiple locations can be accessed and/or modified in a single atomic step. With transactional memory, programmers specify what should be executed atomically, leaving the system to determine how this is achieved. As typically defined, a transactional memory interface allows a programmer to designate certain sequences of operations as "atomic blocks", which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks. The transactional paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then may try to commit the transaction. If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware (HTM), with the hardware operating on shared memory in place and directly ensuring that a transaction is atomic, or in software (STM) that provides the "illusion" that the transaction is atomic, even though in fact it is executed in smaller atomic steps by the underlying hardware. While HTM solutions are generally faster than STM ones, "best effort" HTM may not be guaranteed to be able commit any particular transaction, in which case a programmer cannot rely solely on HTM, even if it is almost always effective.

Transactional memory implementations are typically classified as "blocking" or "nonblocking" depending on whether they allow the delay of one transaction to force another to wait indefinitely. Some object-based nonblocking STM systems suffer a substantial overhead for this advantage, as compared to blocking STMs.

SUMMARY

Systems and methods for implementing and using nonblocking zero-indirection software transactional memory (NZSTM) are disclosed. NZSTM systems implement object-based software transactional memory that may eliminate all levels of indirection except in the uncommon case of a conflict with an unresponsive thread.

In NZSTM systems, shared data may be co-located with a header in an NZObject, and may be addressable at a fixed offset from the header. In various embodiments, the header may include a field indicating the owning transaction, a field indicating one or more transactions having read ownership of the shared object, a field indicating a location of a backup copy of the data portion, and/or a field indicating a clone function usable for creating backup copies of the data portion.

When a transaction initiates opening an NZObject for writing, it may first determine if there is a conflict with another transaction, e.g., by reading the indication of the owner in its header and determining if another transaction owns the shared object for writing. If there is no conflict, the transaction may assume write ownership of the object, copy the object's data to another location, and modify the data in place (i.e., in the NZObject).

If there is a conflicting transaction, rather than forcing the transaction to abort (e.g., by changing the status of the conflicting transaction to ABORT), the transaction may request that the conflicting transaction (i.e., the owning transaction) be aborted. For example, in some embodiments, the requesting transaction may set a flag associated with the owning transaction to indicate a request that the owning transaction abort itself. If the conflicting transaction acknowledges the abort request, e.g., by changing its status to ABORT, the transaction may assume write ownership of the shared object, create a copy of the object's data in another location, and modify the data in place.

In the uncommon case that the conflicting transaction does not respond to the abort request, the requesting transaction may proceed without waiting for the conflicting transaction to abort itself. For example, in different embodiments, the requesting transaction may wait for a pre-determined timeout period before proceeding, or may proceed when a contention manager determines that the requesting transaction should not wait for acknowledgement (e.g., according to a policy for managing conflicts). The requesting transaction may proceed by "inflating" the NZObject (such that its metadata identifies a newly created copy of the object's data), assuming write ownership of the shared object, and modifying the newly created copy of the data. The inflated NZObject may include a locator (which includes a field identifying the conflicting transaction) and may introduce one or more levels of indirection (e.g., the locator may include a field indicating a location of the data copy). If the conflicting transaction (i.e., the previous owner) eventually aborts itself, another transaction may restore the NZObject to its un-inflated form.

In some embodiments, transactions involving NZObjects are executed using best effort hardware transactional memory if it is available and effective, and software transactional memory if not, yielding a hybrid transactional memory system, NZTM.

The methods described herein may be implemented by program instructions included in a memory coupled to one or more processors in a computing system, (e.g., by program instructions included in a computer-readable storage medium and executable by the one or more processors in the computing system), in some embodiments. The program instructions may be included in the same memory as one in which the shared data object(s) and/or shared control location(s) are instantiated, or in a different memory, in different embodiments.

Figure 1:
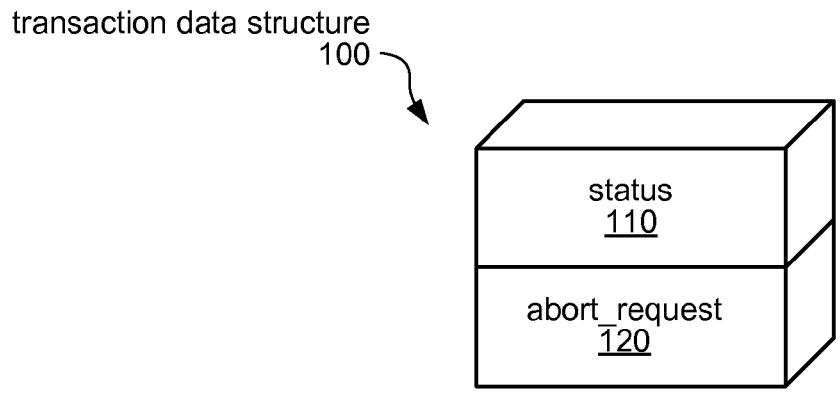
FIG. 1 is a block diagram illustrating a transaction data structure, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for implementing and using nonblocking zero-indirection transactional memory systems are disclosed. These systems include a nonblocking object-based STM that is designed for near-optimal cache performance. In various embodiments, object data may be stored "in place" (i.e., without levels of indirection) in the common case, and metadata may be co-located with the data it controls in order to improve cache performance. They may also be implemented in a hybrid design, in which transactions can make use of hardware transactional memory support to boost performance. Thus, the system and methods disclosed herein may in some embodiments support nonblocking object-based hybrid transactional memory (NZTM) that is competitive with blocking implementations but does not suffer the disadvantage that a transaction that encounters a conflict with an unresponsive thread has no choice but to wait for it. NZTM implementations may execute transactions using best-effort hardware transactional memory if it is available and effective, but can execute transactions using NZSTM, a compatible software transactional memory system otherwise.

Previous STM implementations are generally one to two orders of magnitude slower than what Hardware Transactional Memory (HTM) can reasonably be expected to achieve. However, most HTM proposals are complicated and leave tricky issues unresolved. Hybrid Transactional Memory (HyTM), in which transactions can be attempted using HTM support, but executed entirely in software in case they fail, may allow for simpler best-effort HTM (since the HTM may not necessarily guarantee to be able to commit all transactions). In addition, the HyTM approach may in some cases be used to develop and test transactional programs in existing systems today, and may exploit best effort HTM support as it becomes available. As the HTM support improves over time, applications developed using HyTM will automatically benefit from the improvements. Thus HyTM supports and encourages an incremental approach to the adoption of HTM support.

The system and methods described herein focus on object-based HyTM implementations, in which it is assumed that data objects have headers that can be easily located whenever the application accesses an object. In some previous software transactional memory systems, to access the current value of an object, a thread must first read a "start" pointer associated with the object in order to determine a current "locator", then read the contents of the locator to determine the last transaction to open the object, then read the status of that transaction to determine which of two copies of the object indicated by the locator is current, and finally access that copy. Other previous systems eliminated one level of indirection from such systems in the common case in which the object is not being modified, but still involve at least one level of indirection, even in the best case, and require transactions to copy objects they modify. Some recently proposed STM implementations store object data in place and (optionally, in some cases) co-locate object metadata with objects. However, these implementations have sacrificed the nonblocking progress properties provided by the earlier implementations, and most have implied or argued directly that this is fundamentally necessary in order to store object data in place and co-locate metadata with object data.

Using the system and methods described herein it may not be necessary to sacrifice nonblocking progress properties in STMs in order to store data in place in the common case, and to co-locate metadata with data objects. Specifically, the Nonblocking Zero-Indirection Software Transactional Memory (NZSTM) described herein stores object data in place in the common case, resorting to a level of indirection only when a thread encounters a conflict with a thread that is unresponsive, for example because it is preempted.

The system described herein may in some embodiments be optimized for the case in which HTM support is available and is able to commit most transactions. Because hardware transactions usually access objects in place, object metadata may be co-located with the objects themselves, and transactions executed using HTM may not need to copy objects they modify. This may facilitate near-optimal cache behavior in the common case, in some embodiments.

One consideration in designing nonblocking STMs is resolving the uncertainty arising after a conflicting transaction is aborted. Because the aborted transaction may delay indefinitely in discovering its fate, and in the meantime may modify the data, in-place modification makes the natural home location for the data unsafe for future transactions until the uncertainty has been resolved. Therefore the correct data may need to be stored somewhere other than its natural home in such cases, and may lead to indirection and associated overhead during this period. NZSTM differs from previous nonblocking STMs in that, rather than actively aborting a conflicting transaction (i.e., forcing it to abort), a transaction can "request" that the transaction abort itself, and wait a short time until it does. If it does so, then the uncertainty is resolved and the requesting transaction can continue to access the data in place. Thus, the overhead of introducing levels of indirection may be avoided except when the conflicting transaction is unresponsive.

In some embodiments, it may be possible to largely avoid this situation. For example, the Solaris™ schedctl function can discourage the scheduler from preempting a thread during the blocking part of a transaction. Although such workarounds can avoid the disadvantages of blocking STMs in many cases, some embodiments may seek to eliminate the problem in the first place, provided the cost is not too high. The system and methods described herein may be able to largely eliminate the performance gap between previous blocking and nonblocking object-based transactional memory implementations by eliminating their levels of indirection.

The programming model for NZTM may include some data structures that are similar to those of previous STM implementations. For example, the transaction object in an NZTM may include a status field that can have values of ACTIVE, ABORTED, or COMMITTED, in some embodiments. However, NZTM's transaction objects additionally contain an abort_request flag, which is used to request that the transaction abort itself. FIG. 1 illustrates one embodiment of a transaction data structure 100, which includes a status field 100 and an abort_request flag 120. In some embodiments, abort_request flag 120 is stored together with the status 110, so that both may be accessed atomically using a compare-and-swap (CAS) instruction. Note that the abort_request field 120 is initially false. Note also that in various embodiments, a transaction data structure may include more, fewer, or different fields than those illustrated in FIG. 1 and described above, and/or may partition similar information in different combinations within and between various fields of a transaction data structure and/or other objects associated with a transaction in a transactional memory implementation.

Figure 2:
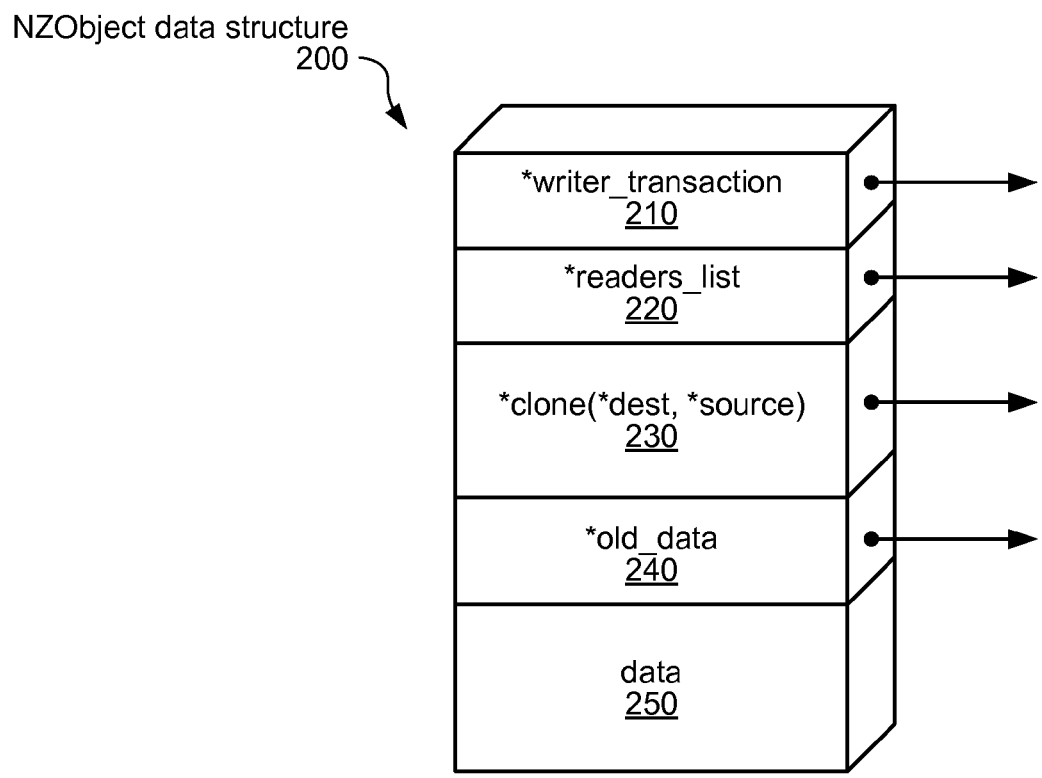
FIG. 2 is a block diagram illustrating an NZObject data structure in a nonblocking zero-indirection transactional memory implementation, according to one embodiment.

The NZObject structure may be analogous to other transactional memory object structures in that it encapsulates a program object that can be accessed by NZTM transactions. As illustrated by the example in FIG. 2, an NZObject data structure, such as NZObject 200 may contain the following fields:

writer_transaction 210—if non-NULL, this metadata field points to the last transaction to open this object for writing.

readers_list 220—if non-NULL, this metadata field points to a linked list of readers of this object.

clone 230—this metadata field points to a function that can be used for creating a copy of the object.

old_data 240—this metadata field points to a backup copy of the object while a transaction that modifies the object is in progress.

data 250—this field contains the actual object data. Because the object data is stored at a fixed offset from the start of the object, there is no level of indirection required to access it. Note that the data field may have any size or structure, in different embodiments.

In some embodiments, after an NZObject is initialized, data 250 contains the initial value of the object, and all other fields (except clone) are NULL. Note that in various embodiments, an NZObject may include more, fewer, or different fields than those illustrated in FIG. 2 and described above, and/or may partition similar information in different combinations within and between various fields of an NZObject and/or other objects associated with a shared data object. Also note that various fields of an NZObject described herein as containing data values may include pointers to a data value instead of or in addition to data values, and vice versa. In other words, in different embodiments, different numbers and types of indicators serving to provide the functionality of the data fields and metadata fields described above may be included in an NZObject.

A simple blocking STM described below may provide a basis for a non-blocking NZSTM and for a hybrid variant NZTM that can execute transactions using HTM support if available. Note that in some embodiments, one or more contention managers (e.g., one for each thread) may be consulted to decide if and when to force a conflicting transaction to abort. In some embodiments, every call to a contention manager method eventually returns (unless the requesting transaction stops on its own, for some reason), and every transaction that repeatedly requests to abort another transaction is eventually granted permission to do so or is instructed to abort itself instead. However, this does not necessarily mean that contention managers must guarantee progress in the presence of conflicts. Whether a particular contention manager should provide such a guarantee, and under what assumptions and system models it should do so, is a policy decision that may depend on applications, environments, and other factors. For example, an "Aggressive" contention manager may in some embodiments always and immediately grant permission to abort any conflicting transaction, while a "Polite" contention manager may adaptively back off a few times when it encounters a conflict before allowing the conflicting transaction to be aborted. In addition to its explicit purposes, a contention manager's methods may implement other measures, such as backoff and queuing, to manage contention, in some embodiments.

In a simple blocking STM, a thread begins a transaction by creating a new transaction object with its status set to ACTIVE. It then proceeds to execute its transaction, "opening" each object it accesses, either for reading or for writing. When it completes execution of the transaction, it attempts to change its status from ACTIVE to COMMITTED. During execution, another transaction that detects a conflict with this one may decide to wait for it or to attempt to abort it, e.g., according to the decision of a contention manager.

As described above, unlike with previous STM implementations, a transaction in a NZTM implementation may not explicitly abort a conflicting transaction (i.e., it may not force the conflicting transaction to abort by changing its status to ABORTED), but instead may request that the transaction abort itself. In some embodiments, this request is made by changing the conflicting transaction's abort_request flag (e.g., abort_request 120) to "true" (while confirming that its status 110 is still ACTIVE). For example, in some embodiments the conflicting transaction's abort_request flag is set using an atomic read-modify-write type operation, such as a CAS instruction or a load-linked (LL) and store-conditional (SC) operation pair. When the transaction observes that its abort_request flag 120 is true, it may respond by setting its status field 110 to ABORTED. The requesting transaction may in some embodiments wait for this to occur before proceeding to open the object on which the conflict occurred. Because of this waiting, this simple STM implementation is blocking.

Normally, the data field 250 of an NZObject contains the current value of the object. A transaction that wishes to modify the object acquires exclusive ownership of the object by placing a pointer to its transaction object in the object's writer_transaction field 210. Before modifying the data, the transaction creates a copy of it (e.g., using the object's clone function), and makes the object's old_data field 240 point to the copy. This copy is needed in case the transaction aborts, in which case it can be copied back to the object's data field 250, thus undoing the transaction's effects. Because the copy is not stored in place with the NZObject, creating the copy may incur additional cache misses, as compared to a pure blocking STM, in some embodiments. Nonetheless, this approach eliminates the level of indirection present in previous nonblocking STMs for transactions executed using HTM as well as for read operations of NZSTM in the common case. In embodiments in which HTM support is available and usually effective, and because reads are usually much more common than writes, this overhead may be imposed only in uncommon cases. In some embodiments, a version of NZSTM may be optimized for existing systems (i.e., without HTM support). In such embodiments, it may be preferable to use incremental backup logs, rather than copying entire objects, to reduce this overhead.

Some embodiments may employ a visible readers mechanism, in which a transaction opening an object for reading inserts a pointer to itself into the object's readers list (e.g., pointed to by readers_list field 220). Using this mechanism, transactions opening the object for writing may in some embodiments detect conflicts with transactions reading the object, and may decide to abort them if necessary to resolve the conflict. Note that the tradeoffs between invisible, semi-visible, and visible read mechanisms may be much the same for NZTM as for other STM and HyTM systems. The use of a visible readers mechanism may be especially well suited for systems in which HTM is available and usually effective. In this case, the benefit of making hardware transactions faster may outweigh any additional cost associated with using visible readers for software transactions.

As previously noted, a NZTM implementation may be nonblocking in the common case, but may share the advantages of some blocking STM mechanisms, i.e., by storing object data "in place". Thus, a NZTM implementation may avoid the costly levels of indirection in previous nonblocking STMs in the common case, and may improve cache performance by co-locating object metadata with the data it controls. As previously noted, a transaction in a NZTM implementation may request that a conflicting transaction abort itself. The transaction may observe that its abort_request flag 120 is true and may respond by setting its status field 110 to ABORTED. In the case that the requesting transaction waits indefinitely for this to occur before proceeding to open the object on which the conflict occurred, the NZTM implementation may actually be blocking. However, in other cases, the requesting transaction may not wait indefinitely for the conflicting transaction to respond to the request to abort, resulting in nonblocking behavior. In some embodiments, the NZTM implementation may use an inflated data object to handle such cases.

Figure 3:
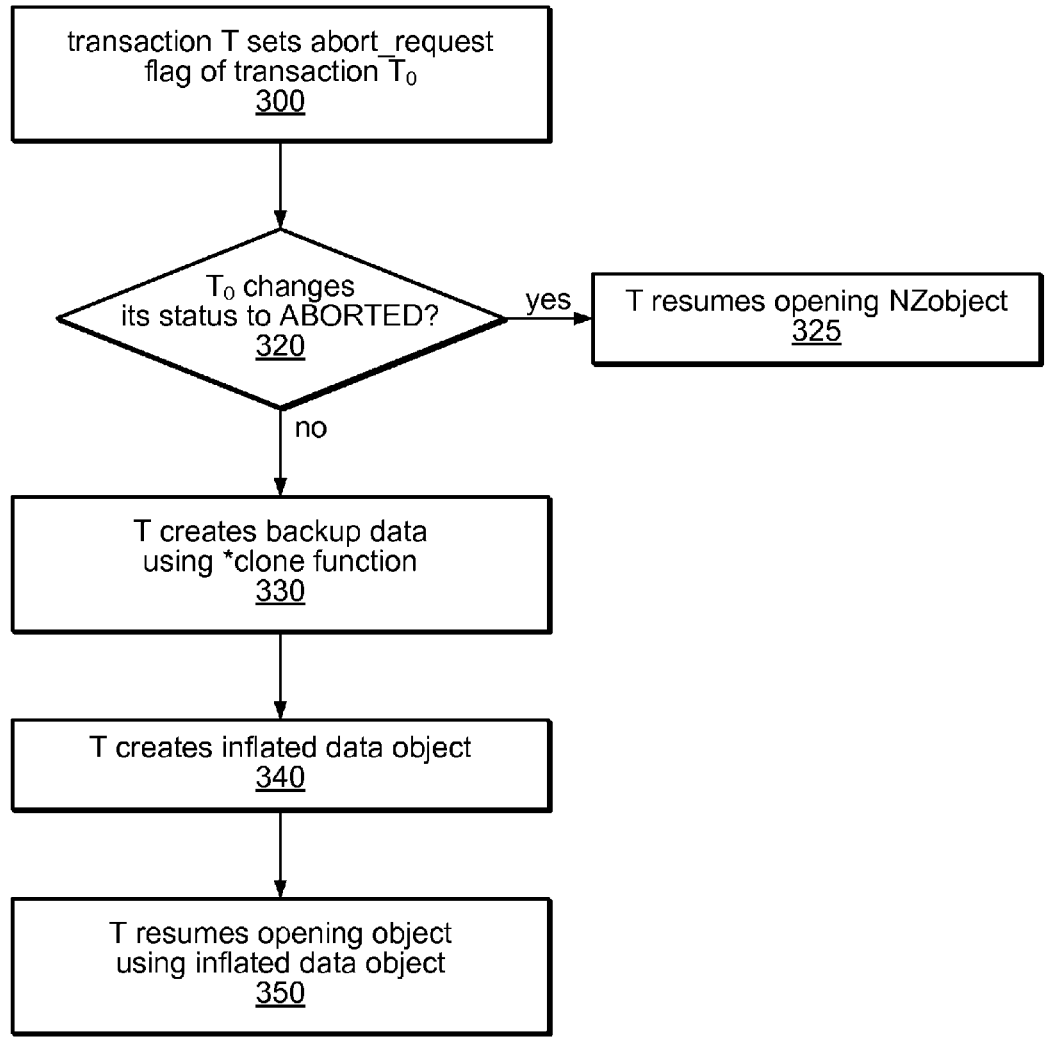
FIG. 3 is a flowchart illustrating the use of an abort_request and an inflated data object in a transactional memory implementation, according to one embodiment.

FIG. 3 illustrates the use of the abort_request mechanism and the use of an inflated data object, according to one embodiment. In this example, a transaction T may desire access to a shared data object, but may find that another transaction, $T_0$, has ownership of the data object. In various embodiments, when such a conflict is detected, transaction T may request that the conflicting transaction, $T_0$, abort itself, as in 300. As described above, this request may be made by transaction T setting an abort_request flag of $T_0$'s transaction object. $T_0$ may or may not respond to T's request to abort in a timely manner, as shown in 320. If $T_0$ does respond by changing its status to ABORTED, shown as the positive exit from 320, transaction T may continue in its effort to open the data object, as in 325. Opening a data object for reading and opening a data object for writing are described in more detail below.

If $T_0$ does not respond to T's request to abort in a timely manner, shown as the negative exit from 320, transaction T may create a backup of the object data using the clone function specified by the pointer in the NZObject (e.g., clone field 230). This is shown as 330 in FIG. 3. In some embodiments, T may wait for a response (i.e., for $T_0$ to set its status to ABORTED) for a pre-determined amount of time (i.e., a pre-determined timeout period), or may wait for a period of time determined by contention manager or policy, before proceeding at 330 (not shown). Once T creates a backup copy of the data, it may create an inflated data object, as in 340. This inflated data object may be similar in structure and contents to those used in previous STM systems, in some embodiments. One such STM system is disclosed in commonly assigned U.S. patent application Ser. No. 10/621,072, filed Jul. 16, 2003, entitled, "Software Transactional Memory for Dynamically Sizable Shared Data Structures," and naming Mark S. Moir, Victor M. Luchangco, and Maurice Herlihy as inventors. For example, the inflated data object may introduce one or more levels of indirection to handle the data object in the uncommon case that a transaction that has been asked to abort itself does not do so in a timely manner. The creation and use of an inflated data object, and its contents, are described in more detail below. After creating the inflated data object, transaction T may resume opening the data object for reading or writing using the inflated data object, as in 350. As illustrated in FIG. 3, in the case that a conflicting transaction responds to a request to abort itself by doing so, the requesting transaction may proceed with operating on the data object in place.

Figure 4:
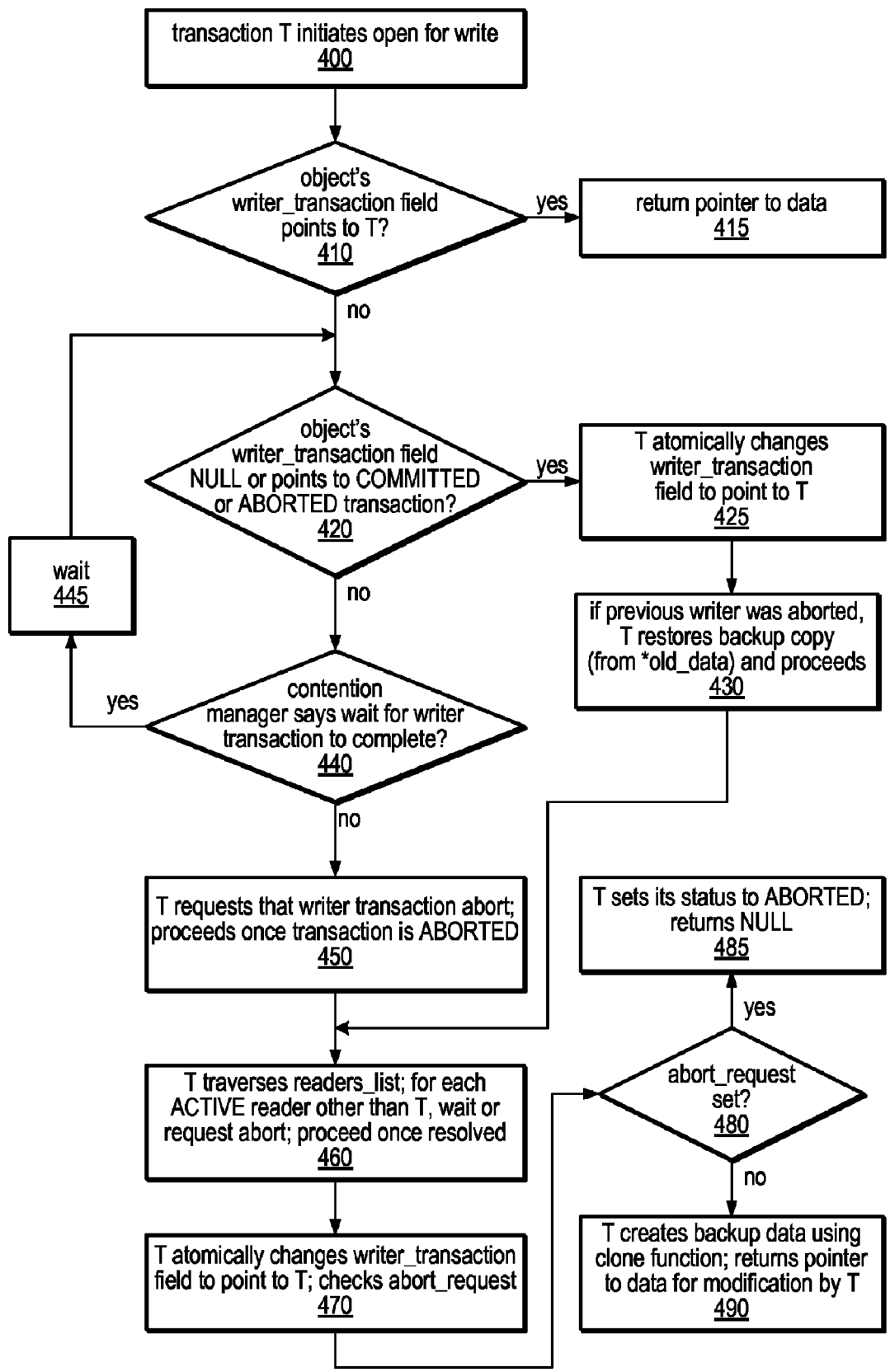
FIG. 4 is a flowchart illustrating a method for opening a shared object for writing in a transactional memory, according to one embodiment.

FIG. 4 illustrates in more detail how transactions may open objects for writing, according to one embodiment. In this example, a transaction T initiates opening a data object for writing, as in 400. If T finds that the object's writer_transaction field points to T's transaction object, then T has previously opened this object for writing. In this case, shown as the positive exit from 410, T simply returns a pointer to the object's data field (e.g., data field 250). Otherwise, T must ensure that there are no conflicts with other transactions before acquiring ownership of the object.

If the writer_transaction field is NULL, or points to a committed or an aborted transaction, shown as the positive exit from 420, there is no conflict with other writing transactions. In this case, T atomically changes the writer_transaction field to point to its transaction object, as in 425 (e.g., using CAS to ensure it has not changed in the meantime). If writer_transaction points to an active transaction, shown as the negative exit from 420, then a contention manager may be consulted, as in 440. If the contention manager determines that T should wait for the other writing transaction to complete, shown as the positive exit from 440, T may wait (e.g., for a pre-determined about of time), as in 445, and then may check again to see if the other writing transaction has completed (i.e., to see if the writing transaction's status is ABORTED or COMMITTED), shown as the loop back to 420, in this example. Note that to avoid deadlock, even simple blocking implementations such as this one may include a limit on the amount of time (or on the number of retries) the system may allow before eventually timing out and asking the other writing transaction to abort itself (not shown). As described above, the contention manager may be configured to aggressively handle contention (e.g., by always allowing a transaction to abort a conflicting transaction), to require a transaction to temporarily back off to give a conflicting transaction a chance to complete, or to apply any suitable policy or mechanism that may or may not guarantee progress, in different embodiments. If the contention manager determines that T does not need to wait for the writer transaction, or if T temporarily backs off, but gives up before the writing transaction is complete, T may request that the active transaction abort itself, as described above. This is illustrated as the negative exit from 440 and block 450. As illustrated in FIG. 4, once the writer transaction's status is ABORTED, T may proceed with opening the object for writing.

At this point, there are no conflicts with other writing transactions, but T may still check for conflicts with reading transactions. As illustrated in FIG. 4, to do so, T may traverse the object's readers_list, such as readers_list 220, looking for active transactions (as in 460). For each active transaction it finds (other than itself), T may consult the contention manager to decide whether to wait or to request the other transaction to abort. If T is in the object's readers list, then it is upgrading its access to the object from read to write. In this case, because T already owns the object during this traversal, there is no risk that another transaction modified the object after T opened the object for read and before T acquired it for write unless that transaction has requested T to abort. Therefore, T can ensure the upgrade is consistent by checking its abort_request flag after acquiring ownership of the object. This is illustrated in 470. Note that T may have changed the writer_transaction field to point to itself earlier, in 425.

If T finds the abort_request flag set, shown as the positive exit from 480, it changes its status to ABORTED, and returns a NULL pointer, indicating that the transaction has aborted, as in 485. In some embodiments, objects may be opened using macros that check whether the returned pointer is NULL, and control may be diverted to an abort handler if it is. If the abort_request flag is not set, shown as the negative exit from 480, T creates a backup copy of the data using its specified clone function (e.g., that specified by clone field 230), points to it using the old_data field 240, and returns a pointer to data field 250 for modification by transaction T, as in 490.

Note that, as illustrated in FIG. 4, when all potential conflicts have been resolved, if the object was owned by an aborted transaction immediately before T acquired it, T restores the backup copy (indicated by old_data 240) if there is one before proceeding. This is illustrated at 430.

Figure 5:
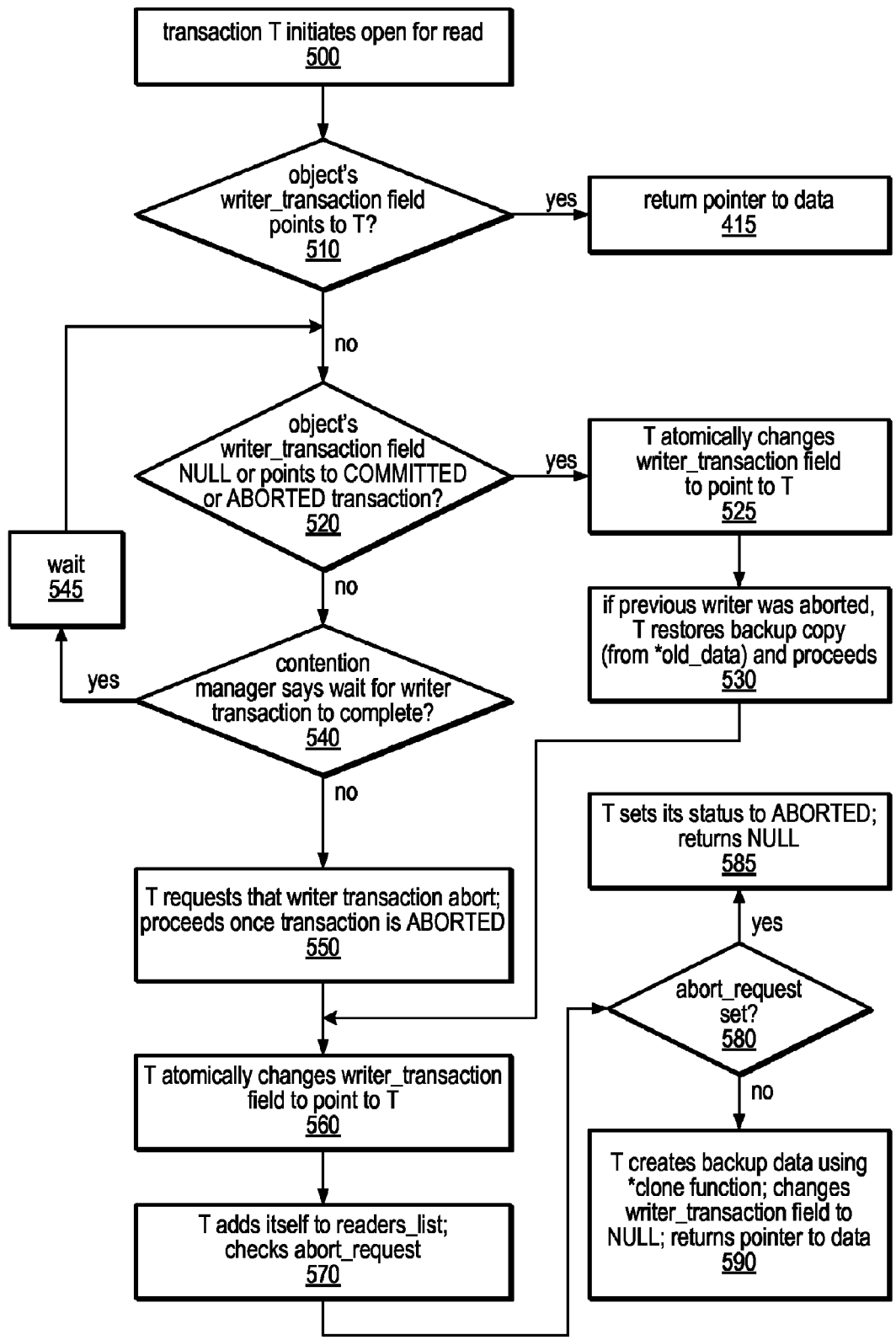
FIG. 5 is a flowchart illustrating a method for opening a shared object for reading in a transactional memory, according to one embodiment.

FIG. 5 illustrates in more detail how transactions open objects for reading. In this example, a transaction T initiates opening an object for reading, as in 500. If T already owns the object for writing (i.e., the object's writer_transaction field 210 points to T's transaction object), T simply returns a pointer to the object's data field 250. Otherwise, T checks for conflicts with writing transactions and resolves them if necessary, in a manner similar to that described above regarding opening for writing. In this example, the operations illustrated in elements 520, 525, 530, 540, 545, and 550 are similar to those described above regarding elements 420, 425, 430, 440, 445, and 450 of FIG. 4, respectively.

As illustrated in FIG. 5, once any conflicts with writing transactions are resolved, T temporarily acquires exclusive ownership of the object by swapping the object's writer_transaction field 210 to point to itself, as in 560 (unless it has already done so in 525). Then, T adds itself to the object's readers_list 220, and checks its abort_request flag, as in 570. If the abort_request flag is set, shown as the positive exit from 580, T changes its status to ABORTED and returns NULL, as in 585. Otherwise, T creates a backup of the data using the specified clone function, relinquishes exclusive ownership of the object by changing the object's writer_transaction field value to NULL, and returns a pointer to the object's data field 590.

Note that, as in the opening for writing case, T aborts and returns NULL (relinquishing ownership of the object first if necessary) if its abort_request flag 120 is set, shown as the positive exit from 580. In some embodiments, this may ensure that the set of objects the transaction has opened for read are consistent. If T has been aborted due to a conflict with another transaction on another object while attempting to open this object for read, the reads may not be consistent, in which case it may not be safe to return to user code. Validating at other times, while not strictly necessary, may be desirable for performance reasons. For example, in one embodiment, validating may be done before asking another transaction to abort. In another embodiment, validating may be done before waiting for another transaction to abort in response to a request to do so. Either of these approaches may avoid unnecessary aborts and waiting, in different embodiments. Because many object-based systems execute in managed runtime environments that can catch and mask exceptions, this validation may be unnecessary in some embodiments. In other embodiments, the low cost of this validation may be justified given the complications involved in handling all possible bad behavior that could arise from inconsistent reads (including infinite loops that do not raise any exceptions).

Note also that, as in the opening for writing example, T checks to see whether the previous writer transaction it replaced (if any) was aborted, and if so, T restores the backup if one exists, as in 530. After restoring the backup, T stores NULL to the object's old_data field 240 and proceeds.

Note that the reason for temporarily acquiring exclusive ownership of the object while adding an entry into the object's readers_list 220, in this example, is not to protect readers_list 220, which is updated using standard nonblocking mechanisms in preparation for the modifications described later to make the STM nonblocking. Instead, it is to avoid a race condition in which another transaction acquiring the object for write access does not encounter T on readers_list 220 and thus fails to resolve a conflict between itself and T. In other embodiments, other techniques may be used to avoid this condition.

Figure 6:
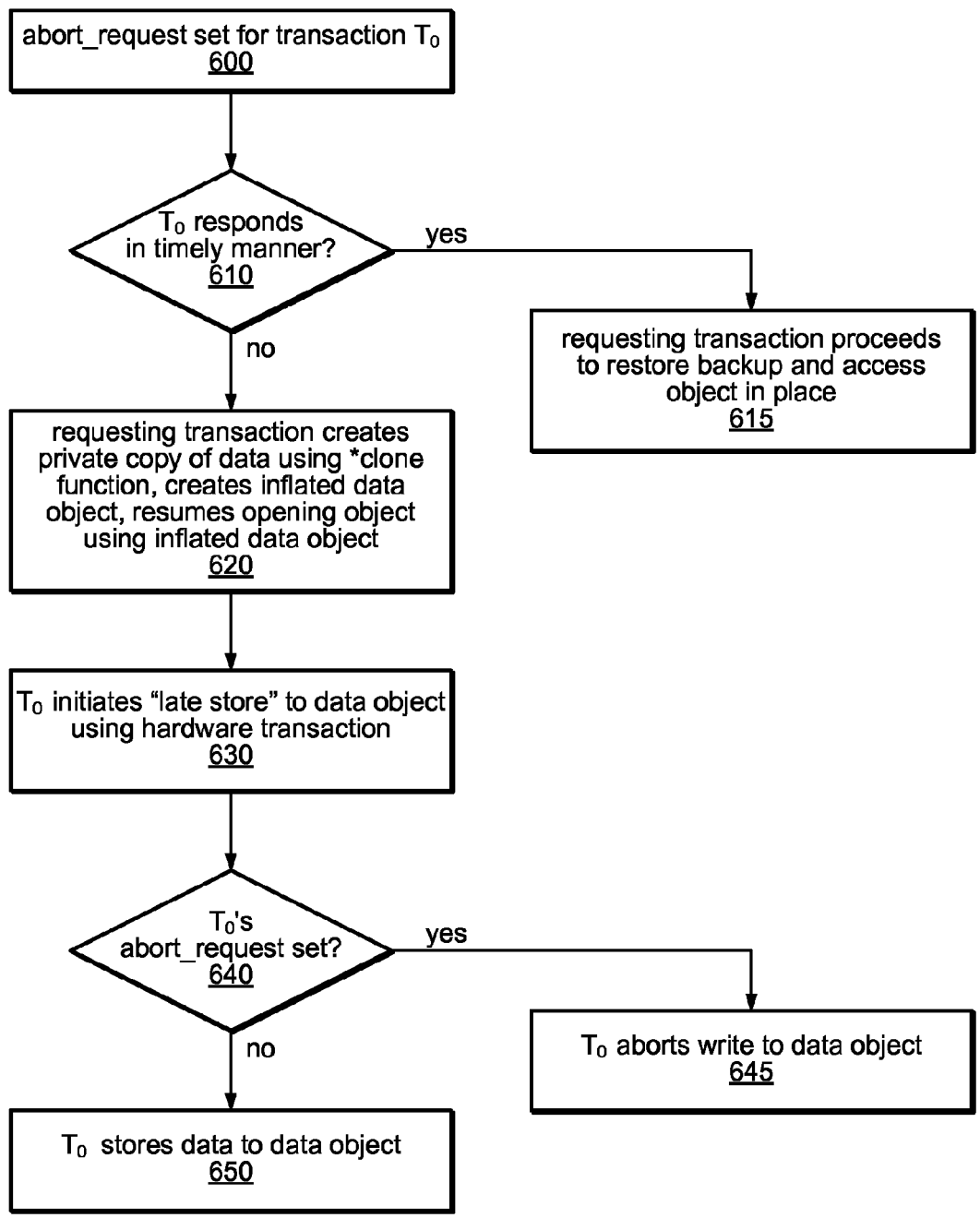
FIG. 6 is a flowchart illustrating the use of hardware transactions in a nonblocking zero-indirection transactional memory implementation, according to one embodiment.

FIGS. 6-9 illustrate various ways to make the simple STM described above nonblocking, thereby ensuring that a transaction can always make progress, even in the face of conflicts with unresponsive transactions. FIG. 6, for example, illustrates the use of HTM support by invoking short hardware transactions within a software transaction in such a system. In the simple blocking STM described above, the reason a transaction that requests another to abort must wait for it to confirm that it has aborted is that it is not safe to restore the backup to the object's data field 250 and continue to access the object in place if there is still a possibility that the "victim" transaction (i.e., the one asked to abort itself) might store to the object's data field.

In the example illustrated in FIG. 6, one transaction requests that another transaction, $T_0$, abort itself, by setting the abort_request flag 120 for transaction $T_0$, as in 600. If $T_0$ responds to the request in a timely manner (e.g., within a pre-determined window or according to a contention policy), shown as the positive exit from 610, the requesting transaction proceeds to restore backup data and access the object in place, as described herein.

If, however, transaction $T_0$ does not respond by aborting itself in a timely manner, shown as the negative exit from 610, the requesting transaction may create a private copy of the data for modification from the backup copy using the specified clone function, create an inflated data object, and proceed with opening the object using the inflated data object, as in 620. The creation, use, and contents of the inflated data object are described in more detail later.

At some point, $T_0$ (having not aborted itself) may initiate a "late store" to the data object, as in 630, thinking it still owns the data object. In this example, such "late stores" may be avoided by making them conditional upon the storing transaction's abort_request flag not being set. As illustrated in FIG. 6, this can be achieved using a short HTM transaction that reads the abort_request flag (as in 640), confirms whether it is false (shown as the negative exit from 640), and performs the store if so (as in 650). Otherwise, the late store is aborted, as in 645. This method may be used in various embodiments provided the HTM support guarantees that such simple transactions will always (eventually) succeed, i.e., that no such transaction will deterministically fail.

Figure 7:
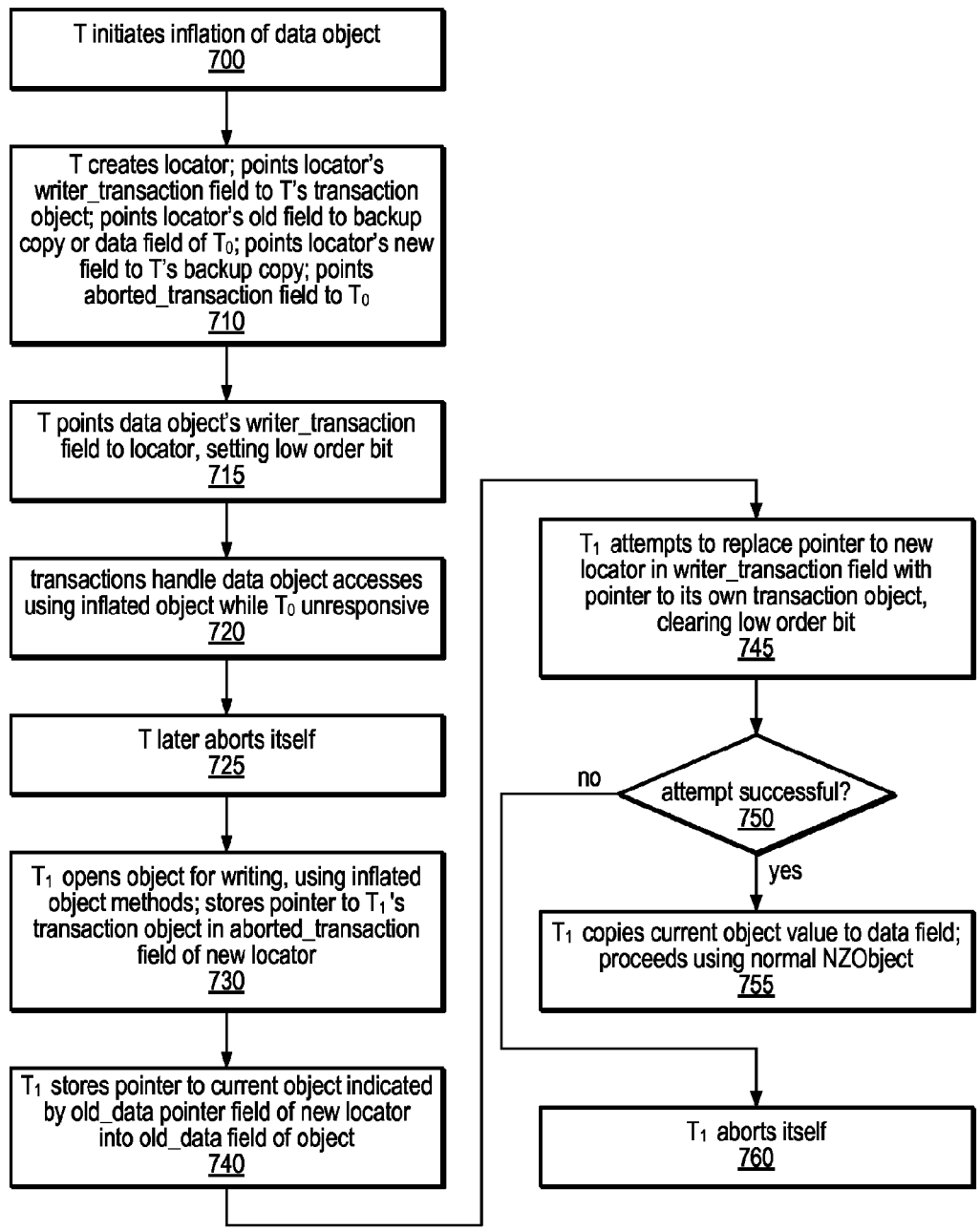
FIG. 7 is a flowchart illustrating the creation and use of an inflated data object in a transactional memory, according to one embodiment.
Figure 8:
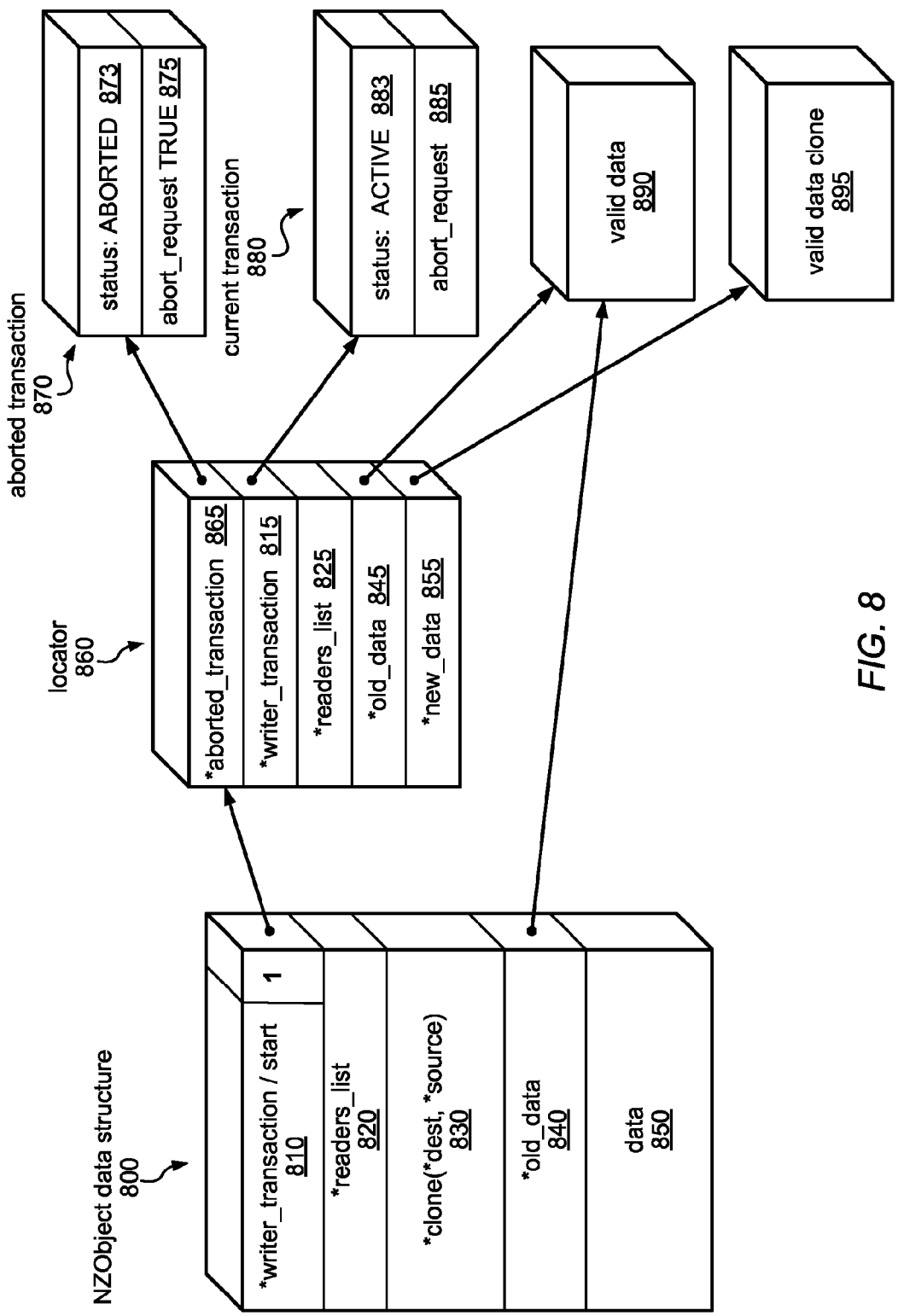
FIG. 8 is a block diagram illustrating an inflated data object structure in a transactional memory implementation, according to one embodiment.

In other embodiments, the simple blocking STM may be made nonblocking even if no HTM support is available or the HTM support does not make such a guarantee. In these embodiments, the simple blocking STM described above may be made nonblocking (in an NZSTM) by temporarily displacing the logical data into a different location than the data field of the NZObject (e.g., data field 250). As previously noted, the data object may be "inflated" and the NZSTM may use techniques involving data indirection only when an aborted owner is unresponsive. FIGS. 7 and 8 illustrate the creation and use of such an inflated data structure, according to one embodiment. In the example illustrated in FIG. 7, when a transaction T has requested the current owner of an object to abort, and the owner has not responded, T may decide not to wait any longer, and may initiate inflation of the object, as in 700. FIG. 8 illustrates one such inflated object, which includes an NZObject data structure 800, as described herein, and a locator object 860.

As shown in 710 of FIG. 7, creating the inflated object, in this example, includes creating the locator object 860, and pointing the locator's writer_transaction field 865 to T's transaction object (current transaction 880) to associate transaction T with the inflated object. Creating the inflated object also includes pointing the locator's old_data field 845 to the backup copy created by the unresponsive transaction (e.g., valid data 890) or to the object's data field 850, if there is none, and pointing the locator's new_data field 855 to a private copy of this backup (e.g., valid data clone 895) created using the object's specified clone function (e.g., that pointed to in clone field 830). At this point, data field 850 may contain stale data. In this example, the NZSTM's locator object includes a readers_list field 825, and an additional field aborted_transaction 865, which points to the transaction object of the unresponsive transaction (e.g., aborted transaction 870).

As shown in FIG. 7, once T has created the inflated object, T attempts to swap the NZObject's writer_transaction field 810 from the unresponsive transaction's transaction object to the newly created locator 860, as in 715. In this example, at the same time, T also sets the low-order bit of the object's writer_transaction field 810 to 1 to indicate that the object now points to a locator object, rather than to an NZSTM transaction object. This results in a state similar to the one illustrated in FIG. 8, in which writer_transaction field 810 functions in a manner similar to that of the "start" pointer, described above. As illustrated in FIG. 7, while $T_0$ is unresponsive, accesses to the NZObject are handled using the inflated object, as in 720. While the inflated object exists, additional locators are introduced as needed, and each new locator introduced includes the aborted_transaction field from the replaced locator, thus preserving the identity of the unresponsive transaction (not shown).

Once the unresponsive transaction finally aborts itself, as in 725, it is no longer modifying the data field 250 of the object. Thus, the object may be restored to being a normal (i.e., un-inflated) NZObject so that subsequent transactions may again enjoy the performance benefits of accessing the object in place. This can be achieved by a transaction $T_1$ as follows. $T_1$ opens the object for writing, as in 730, according to the inflated object's methods, except that it stores a pointer to its own transaction object in the aborted_transaction field of the new locator it installs. This establishes $T_1$ as the transaction that must be aborted and respond before a subsequent attempt to restore the object can begin, in case $T_1$ does not complete the restoration first.

Next, at 740, $T_1$ stores into old_data field 840 a pointer to the current object value (indicated by the old_data pointer 845 in the newly installed locator), so that it will serve as a backup in case $T_1$ aborts. Then, at 745, $T_1$ attempts to replace the locator it just installed in writer_transaction 810 with a pointer to its own transaction object (e.g., using CAS) and to set the low-order bit to 0 to indicate that the object is now back in normal mode. If this succeeds, indicated by the positive exit from 750, $T_1$ simply copies the current object value to data field 250 and proceeds using the normal NZObject to access the object's data in place, as in 755.

Before T swaps its transaction object into writer_transaction field 810, other transactions may wish to access the object, in which case they can proceed as usual, opening the object according to the modified method described above. If a transaction is successful in doing so before $T_1$ swaps its transaction object into writer_transaction field 810, then $T_1$'s CAS on writer_transaction field 810 will fail, so $T_1$ will know that it did not succeed in restoring the object. In this case, indicated by the negative exit from 750, $T_1$ aborts itself (as in 760) in order to allow a subsequent restoration attempt to succeed (because it is now the transaction identified by aborted_transaction field 865).

Note that with this mechanism, a slow transaction that has started to restore an object might store an out-of-date value into old_data field 840. However, this is not a problem, because subsequent attempts to restore the object will not begin until after this transaction acknowledges that it has aborted itself. Until then, old_data field 840 of the NZObject is irrelevant, because the object remains inflated.

Note also that in various embodiments, an inflated NZObject may include more, fewer, or different fields than those illustrated in FIG. 8 and described herein, and/or may partition similar information in different combinations within and between various fields of an NZObject and/or other objects associated with a shared data object.

As previously noted, in some embodiments, the methods and structures described herein may be applied to a hybrid TM system (called an NZTM) that uses NZSTM for software transactions. In a hybrid implementation, transactions may be attempted using HTM and if (repeatedly) unsuccessful, may be eventually retried using NZSTM software transactions. For example, when a transaction executed using HTM opens an object, it may check for conflicts with software transactions, and explicitly abort itself if any are discovered. It may then retry either in hardware or in software, according to decisions made by the contention manager. If no conflict is discovered, the transaction can safely proceed because a subsequent conflict that arises with a software transaction will modify data that the hardware transaction has read, thus preventing it from committing successfully.

A variety of approaches to checking for conflicts with software transactions are possible. Generally, more conservative approaches are simpler, but may be more likely to revert to software, which is harmful to performance. In some embodiments, different schemes can be used together. In one simple and conservative scheme, a hardware transaction opening an object for reading checks that the writer_transaction field is NULL, aborting if not, and a hardware transaction opening an object for writing checks that both writer_transaction and readers_list are NULL, aborting if not. This scheme is conservative because if the writer_transaction field points to an aborted or committed transaction, there is no conflict with writers. Similarly, it may be that the readers_list contains pointers to only aborted and committed transactions, in which case there is no conflict with readers.

Figure 9:
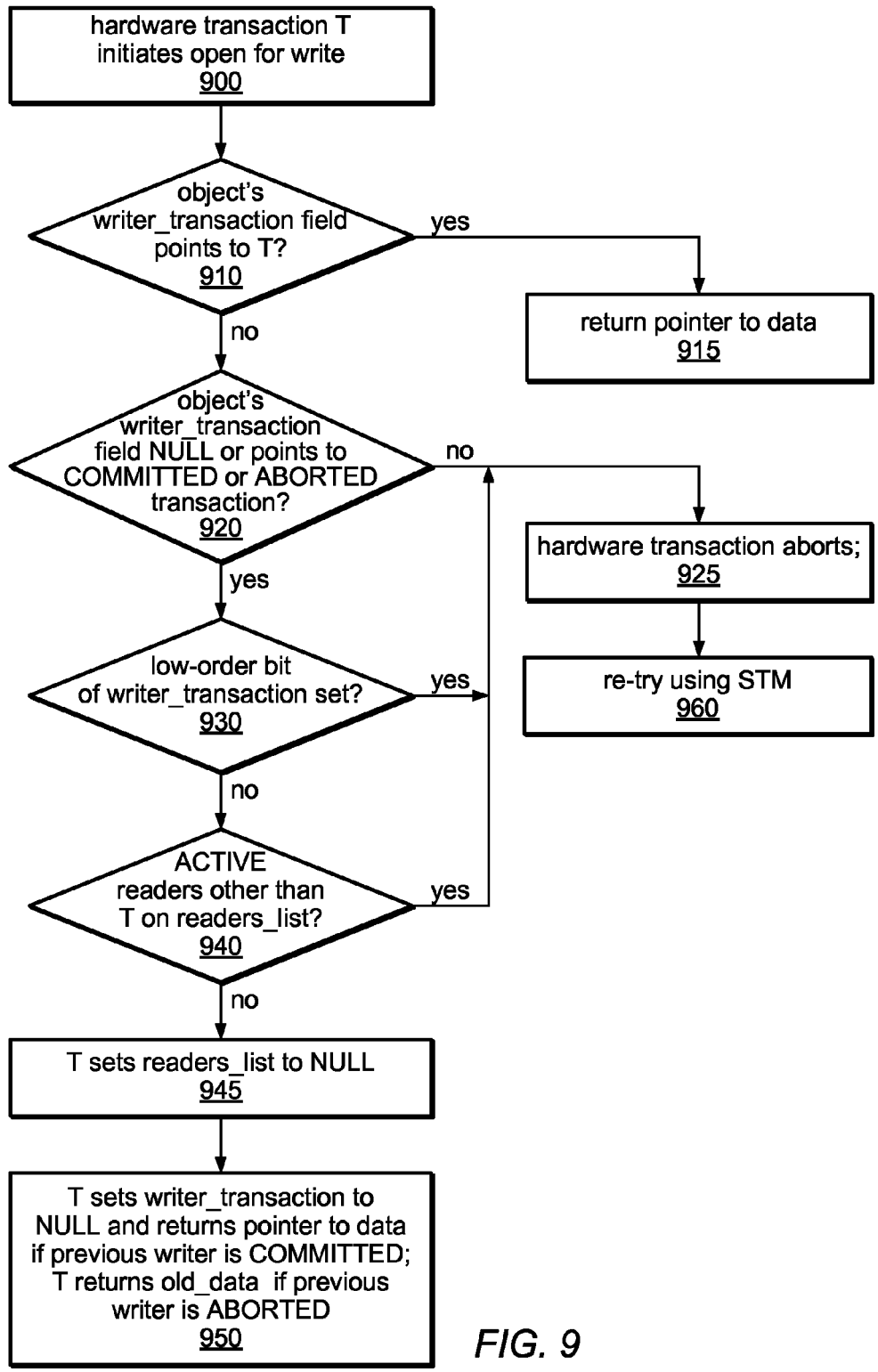
FIG. 9 is a flowchart illustrating the use of an NZObject in a hybrid transactional memory implementation, according to one embodiment.

In other embodiments, hardware transactions may look in more detail to determine if there is a real conflict before aborting. FIG. 9 illustrates the use of one such NZTM, according to one embodiment. In this example, a hardware transaction T initiates opening an object for writing, as in 900. As in several previous examples, transaction T checks the writer_transaction field to determine if it points to T and if so, returns a pointer to the object's data field (shown as the positive from 910, and 915). Transaction T also checks whether the writer_transaction field is NULL or points to another transaction that has completed (i.e., that is COMMITTED or ABORTED), as in 920. If neither is the case, transaction T aborts itself, as in 925. At this point, opening the object for writing may be re-attempted using the STM methods described herein, as in 960.

As illustrated in FIG. 9, using the simple scheme described above, the hardware transaction also checks to see if the low-order bit of the object's writer_transaction field is set, as in 930. If so, this indicates that another transaction has been unresponsive to a request to abort, and the hardware transaction aborts itself, as in 925. Again, at this point, opening the object for writing may be re-attempted using the STM methods described herein, as in 960.

If there are no conflicts detected with writers, the hardware transaction may traverse the object's readers_list, as in 940, checking the status of each transaction in the list to see if any (other than the executing transaction) are ACTIVE. If so, the hardware transaction aborts itself, as in 925, and opening the object for writing may be re-attempted using the STM methods described herein, as in 960. If not, the hardware transaction may set the object's readers_list to NULL, as in 945, eliminating the need for subsequent hardware transactions to traverse the list.

As shown in 950, if no conflicts are detected with readers or writers, and if the writer_transaction field identifies a COMMITTED transaction, the hardware transaction sets the writer_transaction field back to NULL and returns a pointer to the object's data field. On the other hand, if no conflicts are detected with readers or writers, and the writer_transaction field identifies an ABORTED transaction, the hardware transaction returns the value of the object's old_data field. Note that in this case, it is generally not safe to set the object's writer_transaction field to NULL because the current data is pointed to by the value in the object's old_data field; however, in another embodiment, it may be safe to set the object's writer_transaction field to NULL in this case if the hardware transaction also copied the data pointed to by the old_data field back to the data field.

Note that in some embodiments, hardware transactions may access objects that are inflated, as described above. For example, hardware transactions may in some embodiments modify the current object version (identified by the old_data or new_data field of the current locator, depending on the status of the transaction identified by the locator, if it is COMMITTED or ABORTED) in place, without replacing the locator. This is because any software transaction that attempts to open the object will modify its writer_transaction field, thereby preventing the hardware transaction from committing successfully. Similarly, hardware transactions may in some embodiments participate in resetting an inflated object to a normal NZObject by following the same code that a software transaction would. However, in some embodiments, if a hardware transaction encounters a situation in which a software transaction would request another to abort, then it must abort itself. Without more sophisticated HTM support than assumed herein, it may not be useful to request the transaction to abort and then wait for it to abort itself, because when the software transaction aborts itself, this causes the hardware transaction to abort anyway.

It is assumed that processors that have best-effort HTM include instructions for begin-transaction, commit-transaction, and abort-transaction, and that the begin-transaction instruction includes an address where execution is resumed when the transaction is aborted (e.g., a fail address). Note also that because various applications may not push the resource limits of best-effort hardware, in some embodiments, the only reason for aborting from best-effort hardware failure may be conflicts. This may be controlled to some extent by adjusting the number of retries attempted before giving up and reverting to the alternative strategy.

Figure 10:
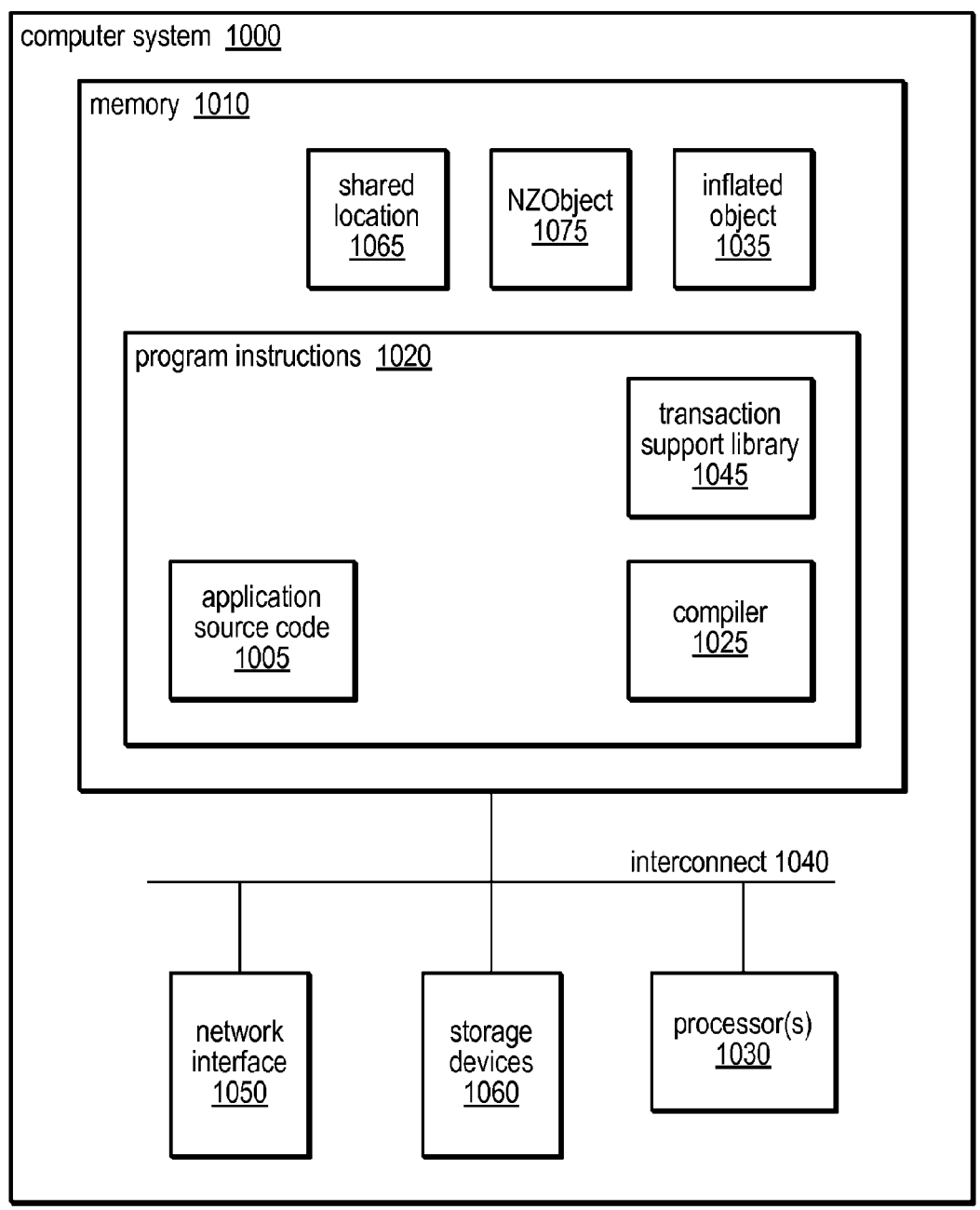
FIG. 10 is a block diagram illustrating an exemplary computer system capable of implementing nonblocking zero-indirection transactional memory, according to one embodiment.

The system and methods described herein may be suitable for application in any of various computing systems supporting concurrent computing. FIG. 10 illustrates a computing system capable of implementing the HTM, STM and/or HyTM functionality described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer) and executable by the machine to implement the methods described herein. The machine-readable medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single-threaded processor, a multi-threaded processor, a multi-core processor, etc.). The computer system 1000 also includes one or more system memories 1010 (e.g., one or more of cache, SRAM, DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) 1060 (e.g., optical storage, magnetic storage, etc.). The memory medium may include other types of memory as well, or combinations thereof. Embodiments of the invention may include fewer or additional components not illustrated in FIG. 10 (e.g., video cards, audio cards, additional network interfaces, peripheral devices, etc.). The processor unit 1030, the storage device(s) 1060, the network interface 1050, and the system memory 1010 are coupled to the system interconnect 1040. One or more of the system memories 1010 may embody a compiler configured to generate program instructions for implementing hardware, software, and/or hybrid transactions as described herein. Additionally, one or more of the system memories 1010 may embody an application including code implementing hardware, software, and/or hybrid transactions.

In some embodiments, memory 1010 may include program instructions 1020 configured to implement a compiler, such as compiler 1025, configured to generate program instructions for implementing hardware, software, and/or hybrid transaction transactional memory, as described herein. Additionally, program instructions 1020 may comprise application source code 1005 and/or compiled application 1055, each of which may include code configured to implement hardware, software, and/or hybrid transactions, as described herein. Furthermore, program instructions 1020 may be configured to implement a transaction support library 1045, configured to provide functions, operations and/or other processes for implementing hardware transactional memory, software transactional memory, and/or hybrid transactional memory, as described herein. Compiler 1025, application source code 1005, compiled application 1055, and/or transaction support library 1045 may each be implemented in any of various programming languages or methods. For example, in one embodiment, compiler 1025 and transaction support library 1045 may be Java™ based, while in other embodiments, they may be written using the C or C++ programming languages. Similarly, application source code 1005 may be implemented in Java™, C, or C++, among other programming languages, according to various embodiments. Moreover, in some embodiments, compiler 1025, transaction support library 1045, and application source code 1005 may not be implemented using the same programming language. For example, application source code 1005 may be C++ based, while compiler 1025 may be developed using C.

As illustrated in FIG. 10, memory 1010 may in some embodiments be configured to include one or more NZObjects 1075 and inflated objects 1035, as well as other shared storage locations 1065, some of which are described herein. For example, in various embodiments, storage locations representing ownership records, transaction records (including headers, write sets and/or read sets), and other local or shared resources may be included in memory 1010. Note also that although various examples included herein refer to both shared memory and local memory (e.g., cache memory), these structures may be implemented as different memory spaces (e.g., a shared memory space and one or more local memory spaces) within a single physical memory or as different memory spaces distributed across any number of physical memories, in different embodiments.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method, comprising:
    a transaction initiating opening a shared object for writing;
    the transaction determining that the shared object is owned for writing by another transaction, wherein the shared object comprises an indicator of the owning transaction, and wherein said determining comprises reading the value of the indicator;
    in response to said determining, the transaction requesting that the owning transaction abort itself;
    wherein said requesting comprises indicating to the owning transaction that an abort is requested, wherein said indicating comprises setting a flag associated with the owning transaction to indicate a request that the owning transaction abort itself, and wherein setting the flag does not force the owning transaction to abort itself.

2. The method of claim 1, further comprising, in response to the owning transaction acknowledging that it will abort itself, the transaction assuming write ownership of the shared object.

3. The method of claim 1, further comprising, in response to the owning transaction not acknowledging the abort request:
- the transaction creating a copy of the shared object in another location;
- the transaction inflating the shared object to include a locator object, wherein the locator object comprises metadata associating the transaction with the copy of the shared object;
- the transaction assuming write ownership of the shared object; and
- the transaction modifying the copy of the shared object.

4. The method of claim 3, further comprising:
- subsequent to said transaction assuming ownership, the owning transaction aborting itself; and
- in response to the owning transaction aborting itself, another transaction restoring the shared object to its un-inflated form.

5. The method of claim 3, wherein the owning transaction is considered to have not acknowledged the abort request if the owning transaction does not acknowledge that it will abort itself within a pre-determined timeout period following said transaction requesting that the owning transaction abort itself.

6. The method of claim 3, wherein said creating a copy, inflating the shared object, assuming write ownership, and modifying the copy of the shared object are performed in response to a contention manager determining that the transaction should not wait for the owning transaction to acknowledge the abort request before proceeding.

7. The method of claim 1, wherein the shared object comprises a header portion and a data portion co-located with the header portion and addressable at a fixed offset from the header portion.

8. The method of claim 1,
- wherein the shared object comprises a header portion and a data portion,
- wherein the header portion comprises the indicator of the owning transaction.

9. The method of claim 8, wherein the header portion further comprises one or more of: an indicator of a reader list comprising one or more transactions having read ownership of the shared object, an indicator of a location of a backup copy of the data portion, or an indicator of a clone function usable for creating backup copies of the data portion.

10. The method of claim 1,
- wherein said initiating and said determining are performed by a hardware transaction; and
- wherein in response to said determining, said requesting is performed by a software transaction.

11. A system, comprising:
one or more processors; and
a memory coupled to the one or more processors and comprising a shared object accessible by one or more threads executing on the one or more processors;
wherein the memory further comprises program instructions executable by the
one or more processors to implement:
- a transaction initiating opening the shared object for writing;
- the transaction determining that the shared object is owned for writing by another transaction, wherein the shared object comprises an indicator of the owning transaction, and wherein said determining comprises reading the value of the indicator;
- in response to said determining, the transaction requesting that the owning transaction abort itself;
- wherein said requesting comprises indicating to the owning transaction that an abort is requested, wherein said indicating comprises setting a flag associated with the owning transaction to indicate a request that the owning transaction abort itself, and wherein setting the flag does not force the owning transaction to abort itself.

12. The system of claim 11, wherein the program instructions are further executable to implement, in response to the owning transaction acknowledging that it will abort itself, the transaction assuming write ownership of the shared object.

13. The system of claim 11, wherein the program instructions are further executable to implement, in response to the owning transaction not acknowledging the abort request:
- the transaction creating a copy of the shared object in another location;
- the transaction inflating the shared object to include a locator object, wherein the locator object comprises metadata associating the transaction with the copy of the shared object;
- the transaction assuming write ownership of the shared object; and
- the transaction modifying the copy of the shared object.

14. The system of claim 13, wherein the program instructions are further executable to implement:
- subsequent to said transaction assuming ownership, the owning transaction aborting itself; and
- in response to the owning transaction aborting itself, another transaction restoring the shared object to its un-inflated form.

15. The system of claim 11, wherein the shared object comprises:
- a header portion; and
- a data portion co-located with the header portion and addressable at a fixed offset from the header portion;
- wherein the header portion comprises the indicator of the owning transaction and one or more of: an indicator of a reader list comprising one or more transactions having read ownership of the shared object, an indicator of a location of a backup copy of the data portion, or an indicator of a clone function usable for creating backup copies of the data portion.

16. The system of claim 11, wherein the program instructions are further executable to implement:
- performing said initiating and said determining using a hardware transaction; and
- in response to said determining, performing said requesting using a software transaction.

17. A computer-readable storage medium comprising program instructions computer-executable to implement:
- a transaction initiating opening a shared object for writing;
- the transaction determining that the shared object is owned for writing by another transaction;
- in response to said determining, the transaction requesting that the owning transaction abort itself;
- wherein the shared object comprises:
  - a header portion; and
  - a data portion co-located with the header portion and addressable at a fixed offset from the header portion;
  - wherein the header portion comprises one or more of: an indicator of the owning transaction, an indicator of a reader list comprising one or more transactions having read ownership of the shared object, an indicator of a location of a backup copy of the data portion, or an indicator of a clone function usable for creating backup copies of the data portion;

wherein said requesting comprises indicating to the owning transaction that an abort is requested, wherein said indicating comprises setting a flag associated with the owning transaction to indicate a request that the owning transaction abort itself, and wherein setting the flag does not force the owning transaction to abort itself.

18. The storage medium of claim 17, wherein the program instructions are further executable to implement, in response to the owning transaction acknowledging that it will abort itself, the transaction assuming write ownership of the shared object.

19. The storage medium of claim 17, wherein the program instructions are further executable to implement, in response to the owning transaction not acknowledging the abort request:

the transaction creating a copy of the shared object in another location;

the transaction inflating the shared object to include a locator object, wherein the locator object comprises metadata associating the transaction with the copy of the shared object;

the transaction assuming write ownership of the shared object;

the transaction modifying the copy of the shared object;

subsequent to said transaction assuming ownership, the owning transaction aborting itself; and in response to the owning transaction aborting itself, another transaction restoring the shared object to its un-inflated form.

* * * * *